United States Patent
Bai et al.

(10) Patent No.: US 8,931,607 B2
(45) Date of Patent: Jan. 13, 2015

(54) CENTRIFUGAL PENDULUM VIBRATION ABSORBER

(75) Inventors: Shushan Bai, Ann Arbor, MI (US); Paul G. Otanez, Troy, MI (US); Vijay A. Neelakantan, Rochester Hills, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 377 days.

(21) Appl. No.: 12/964,552

(22) Filed: Dec. 9, 2010

(65) Prior Publication Data

US 2011/0186395 A1 Aug. 4, 2011

Related U.S. Application Data

(60) Provisional application No. 61/299,757, filed on Jan. 29, 2010.

(51) Int. Cl.
*F16F 7/10* (2006.01)
*F16F 15/14* (2006.01)

(52) U.S. Cl.
CPC ................................. *F16F 15/145* (2013.01)
USPC ........................................................ 188/378

(58) Field of Classification Search
CPC ....................................................... F16F 15/145
USPC .................. 188/378, 379, 380; 416/144, 145; 464/180
See application file for complete search history.

(56) References Cited

U.S. PATENT DOCUMENTS

| | | | | |
|---|---|---|---|---|
| 2,313,024 | A * | 3/1943 | Salomon | 74/604 |
| 3,932,060 | A * | 1/1976 | Vincent et al. | 416/145 |
| 5,495,924 | A * | 3/1996 | Shaw et al. | 188/378 |
| 2005/0079056 | A1* | 4/2005 | Welsh | 416/145 |
| 2009/0116963 | A1* | 5/2009 | Welsh | 416/43 |

* cited by examiner

*Primary Examiner* — Robert A Siconolfi
*Assistant Examiner* — Charles Poon

(57) ABSTRACT

A centrifugal pendulum vibration absorber (CPVA) for absorbing torsional vibration created by operation of an engine includes a plurality of pendulums moveable with respect to a rotatable shaft. The pendulums are connected to the rotatable shaft by a plurality of pins that extend through apertures in the pendulum. The pendulums each move along a path defined by various drive line or powertrain parameters and characteristics. The path is implemented by contouring an active section of the apertures that engage the pins.

15 Claims, 2 Drawing Sheets

CENTRIFUGAL PENDULUM VIBRATION ABSORBER

CROSS-REFERENCE TO RELATED APPLICATIONS

This application claims the benefit of U.S. Provisional Application No. 61/299,757, filed on Jan. 29, 2010, which is hereby incorporated in its entirety herein by reference.

FIELD

The present disclosure relates to a system for absorbing torsional vibration created by operation of an engine, and in particular to a system including a high performance centrifugal pendulum vibration absorber configured to absorb torsional vibrations created during engine operation.

BACKGROUND

The statements in this section merely provide background information related to the present disclosure and may or may not constitute prior art.

Centrifugal Pendulum Vibration Absorbers (CPVAs) are typically used to reduce torsional vibrations in rotating machine components. For example, a rotating member such as a shaft includes several CPVAs, where each CPVA has a pendulum mass that oscillates as the shaft operates. The movement of the pendulum masses counteract torque fluctuations that are created as the shaft operates, which reduces the torsional vibration of the shaft. CPVAs can be designed such that the oscillation frequency of the pendulum mass matches the engine combustion frequency at any engine operating speed. The path of the center of mass of the pendulum has significant effect on the performance of a CPVA. Existing paths are typically circular or cycloidal.

While current CPVAs achieve their intended purpose, there is room in the art to provide a CPVA having a pendulum mass path that is stable during rapid engine speed changes and that provides maximum vibration reduction.

SUMMARY

A centrifugal pendulum vibration absorber (CPVA) for absorbing vibration created by operation of an engine includes a plurality of pendulums moveable with respect to a rotatable shaft. The pendulums are connected to the rotatable shaft by a plurality of pins that extend through apertures in the pendulum. The pendulums each move along a path defined by various drive line or powertrain parameters and characteristics. The path is implemented by contouring an active section of the apertures that engage the pins.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
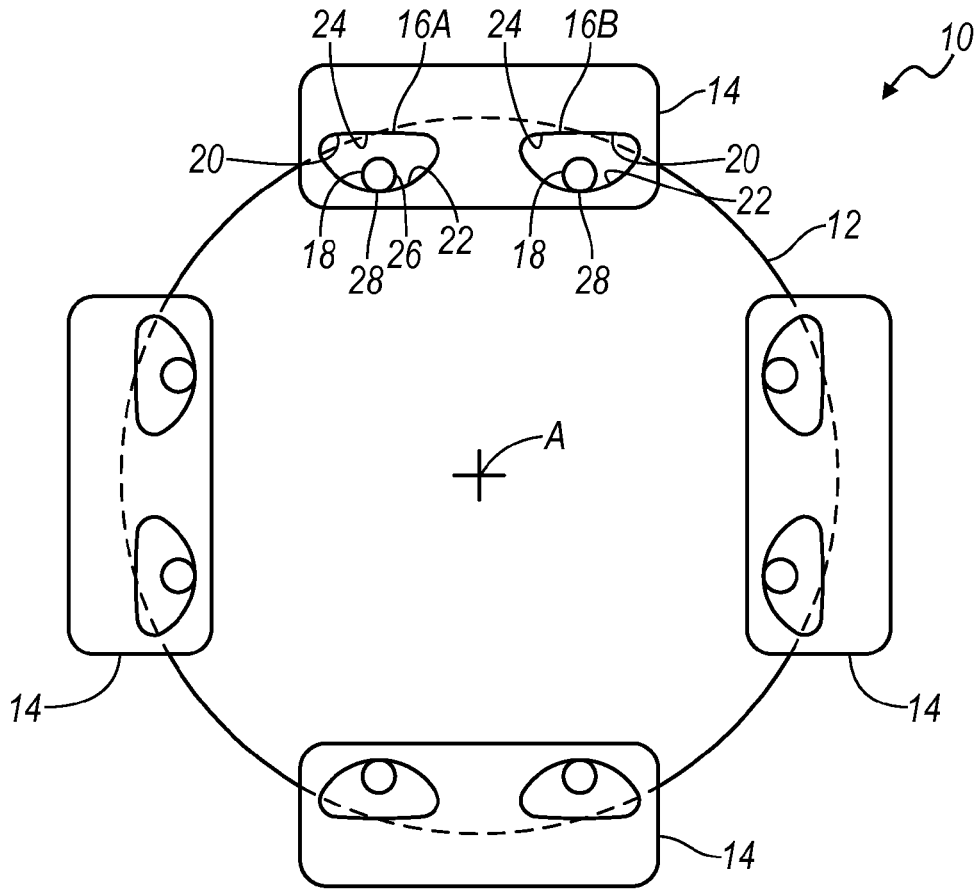
FIG. 1 is a schematic view of an exemplary CPVA according to the principles of the present invention.

The following description is merely exemplary in nature and is not intended to limit the present disclosure, application, or uses. With reference to FIG. 1, a centrifugal pendulum vibration absorber (CPVA) is generally indicated by reference number 10. The CPVA 10 includes a rotating engine shaft or plate 12 and a plurality of pendulum masses 14 that are moveably connected with the first plate 12. The plate 12 is driven by an engine (not shown), or other torque producing machine to provide a driving torque to the plate 12. Accordingly, the plate 12 is rotatable about an axis "A" concentric with the plate 12. The plate 12 is any plate that mounts to an output shaft of an engine such as, for example, a flywheel or flexplate. The plate 12 is operable to transmit torque from the engine to another component within the motor vehicle, such as an axle shaft or transmission component. For example, the plate 12 may be connected to another rotatable plate or member (not shown) that is preferably part of a torque transmitting device such as, for example, a torque converter of an automatic transmission or a clutch of a manual transmission. However, it should be appreciated that the plate 12 may be connected to various other components within a powertrain drive line without departing from the scope of the present invention.

The pendulum masses 14 are each moveably connected with the first plate 12, where each of the pendulum masses 14 includes two apertures 16A and 16B located within the pendulum masses 14. Corresponding pins 18 connected to the plate 12 are provided for each aperture 16, where each aperture 16 receives one of the pins 18 therethrough. Each of the pins 18 have circular cross-sections with a radius of "r". The apertures 16A and 16B are defined by an internal surface 20 of the pendulum mass 14 that includes a first surface or active section 22 and a second surface or passive section 24. The active section 22 defines the path of the pendulum mass 16, as will be described in greater detail below. The passive section 24 preferably has a straight contour, though other contours may be employed without departing from the scope of the present invention. Each of the plurality of pendulum masses 14 are circumferentially arranged in a substantially symmetrical pattern around the rotational axis "A" of the plate 12. In the present embodiment, four pendulum masses 14 are included with the CPVA 10, however those skilled in the art will appreciate that any number of pendulum masses 14 may be employed.

When the plate 12 is at rest, the pendulum masses 14 each remain generally stationary and do not move substantially. However, each pendulum mass 14 oscillates or travels about the corresponding pins 18 when the plate 12 rotates about the axis "A". For example, as the pendulum mass 14 travels about the corresponding pins 18, a portion of an outer surface 26 of the pins 18 slides along the active section 22 of each aperture 16A and 16B. Accordingly, each pendulum mass 14 travels about a specific path that is determined by the contour of the active section 22 which controls the movement of the pendulum mass 14 about the corresponding pins 18. The movement of the pendulum masses 14 along the paths counteract at least some of the torque fluctuations that are created as the engine operates, which thereby reduces torsional vibration.

Figure 2:
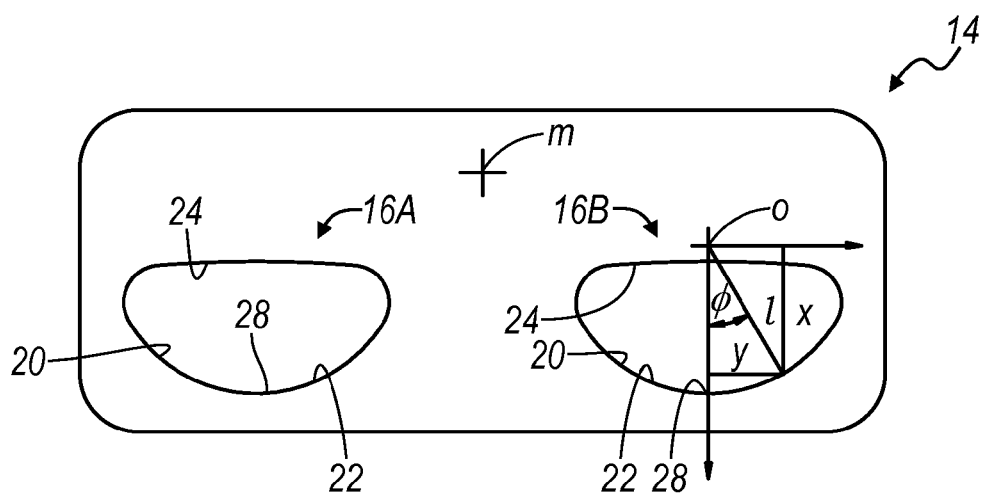
FIG. 2 is an enlarged view of a pendulum mass used in the CPVA shown in FIG. 1.

Turning to FIG. 2, the pendulum masses 14 will be described in greater detail with reference to one of the pendulum masses 14, it being understood that each of the pendulum masses 14 are identical in the present embodiment. The pendulum mass 14 includes a center of mass "m". Each of the apertures 16A and 16B are located equidistant and symmetrical from the center of mass "m". In addition, each of the apertures 16A and 16B are identically shaped.

Figure 3:
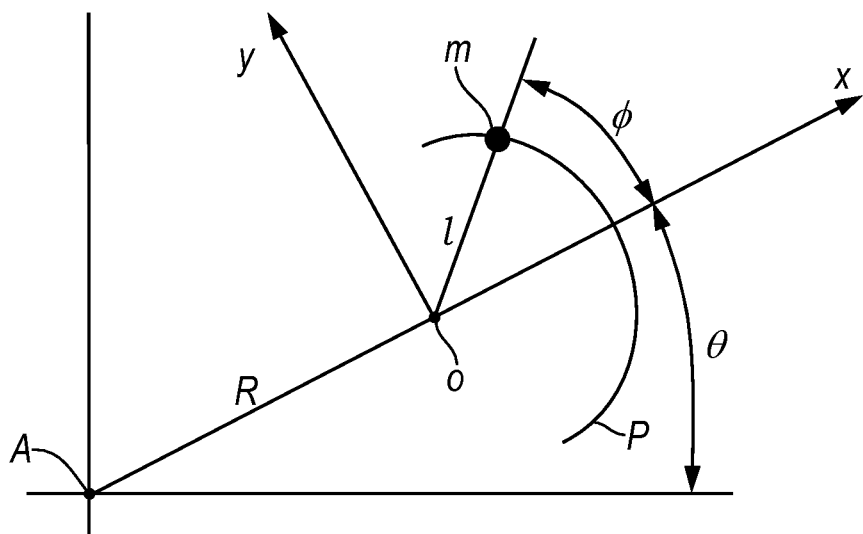
FIG. 3 is a coordinate system illustrating the path of the pendulum mass according to the principles of the present invention.

Turning to FIG. 3, a coordinate system used to define the path of the center of mass "m" of the pendulum 14 during rotation of the plate 12 is illustrated. "A" is the rotational axis that is the center of the rotary motion of the plate 12. A Cartesian coordinate (x, y) rotates with the plate 12. The origin of the Cartesian coordinate is "o". The distanced from the rotational axis "A" to "o" is defined by a constant "R". The x axis of the Cartesian coordinate lays on the extended straight line connecting the points "A" and "o". "m" is the center of mass of the pendulum mass 14, as described above. "l" is the length of the straight line from the point "o" to center of mass "m". φ is the angle between the x axis and the line "l". Accordingly, φ is the angular displacement of the pendulum mass 14. θ is the angular displacement of the plate 12. The center of mass "m" of the pendulum mass 14 travels along a path "P".

The path "P" may be defined using the Cartesian coordinate system with the following equations (1) and (2):

$$x = b(1+k_1\phi^2+k_2\phi^4)\cos(\phi) \tag{1}$$

$$y = b(1+k_1\phi^2+k_2\phi^4)\sin(\phi) \tag{2}$$

Alternatively, the path "P" may be defined using the distance "l" from the origin "o" of the Cartesian coordinate system using the following equation (3):

$$l = b(1+k_1\phi^2+k_2\phi^4) \tag{3}$$

In equations (1), (2), and (3), the variable "b" is employed to tune the CPVA 10. The variable "b" is calculated using the following equation (4):

$$\frac{R}{b} = \lambda n^2 \tag{4}$$

In equation (4), "n" is the engine torque oscillation order which is an integer that is defined as the number of engine torque oscillations per every engine revolution. The variable "R" is, as noted above, the distance between the rotational axis "A" of the plate 12 and the origin of the Cartesian coordinate system "o". The variable λ has a value that preferably is between 1 to approximately 1.3. The actual value of λ is dependent on dynamic characteristics the drive line of the motor vehicle. λ is preferably determined through dynamic analysis using simulation models on the specific drive line within which the CPVA 10 is installed.

In equations (1), (2), and (3), the variables "$k_1$" and "$k_2$" are based on the engine torque oscillation order "n" according to Table 1 below:

TABLE 1

| Engine Order (n) | Value of $k_1$ | Value of $k_2$ |
|---|---|---|
| 2 | 0.025 | −0.1 |
| 3 | 0.026 | −0.14 |
| 4 | 0.028 | −0.16 |

Returning to FIG. 2, in order to implement the path "P" of the pendulum mass 14, the contour of the active section 22 for each of the apertures 16A and 16B is defined using either Cartesian coordinates x and y or by an angle φ and distance l from an origin point "o" of the Cartesian coordinate system. The active section 22 may be defined using a Cartesian coordinate system having an origin "o" a distance "R" from the center of rotation of the plate 12 and y axis of the Cartesian coordinate lays on the extended straight line connecting the center-point 28 and "o" the with the following equations (5) and (6)

$$x = b(1+k_1\varphi^2+k_2\varphi^4)\cos(\varphi) + \tag{5}$$
$$r\frac{\{b(2k_1\varphi+4k_2\varphi^3)\sin(\varphi)+b(1+k_1\varphi^2+k_2\varphi^4)\cos(\varphi)\}}{\sqrt{\{(b(2k_1\varphi+4k_2\varphi^3))^2+b^2(1+k_1\varphi^2+k_2\varphi^4)^2(\varphi)\}}}$$

$$y = b(1+k_1\varphi^2+k_2\varphi^4)\sin(\varphi) + \tag{6}$$
$$r\frac{-\{b(2k_1\varphi+4k_2\varphi^3)\cos(\varphi)-b(1+k_1\varphi^2+k_2\varphi^4)\sin(\varphi)\}}{\sqrt{\{(b(2k_1\varphi+4k_2\varphi^3))^2+b^2(1+k_1\varphi^2+k_2\varphi^4)^2(\varphi)\}}}$$

In equations (5) and (6), the variable "r" is the radius of the pins 18 as noted above. Alternatively, the active section 22 may be defined using the distance "l" from the origin "o" of the Cartesian coordinate system using the following equation (7):

$$l = r+b(1+k_1\phi^2+k_2\phi^4) \tag{7}$$

The pins 18 are located on the plate 12 such that when the pins 18 are at a center point 28 along the contour of the active section 22, the distance from the center of mass "m" of each of the pendulum masses 14 to the rotational axis "A" or center of the plate 12 is equal to R+b.

Figure 4:
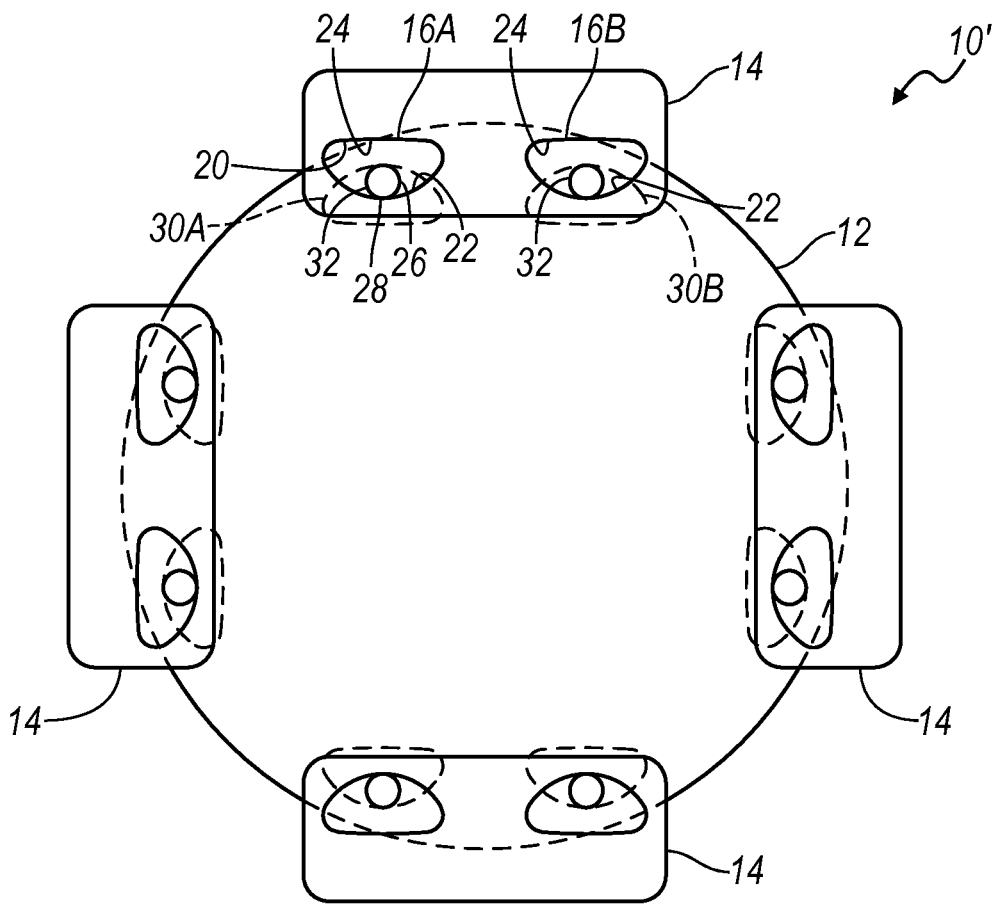
FIG. 4 is a schematic view of another exemplary CPVA according to the principles of the present invention.

Turning to FIG. 4, an alternate CPVA that implements the path "P" of the center of mass "m" of the pendulum masses 14 is generally indicated by 10'. The CPVA 10' is similar to the CPVA 10 and therefore like components are indicated by like reference numbers. However, plate 12 includes two apertures 30A and 30B and the pins 18 are replaced with rollers 32. The rollers 32 are not fixedly connected to the plate 12. The apertures 30A and 30B are in partial axial alignment with apertures 16A and 16B and have identical contours of their active sections 22, though apertures 30A and 30B are mirror images of apertures 16A and 16B. The rollers 32 have a circular cross-section and a radius "r". The rollers 32 ride on the active sections 22 of both the apertures 16A and 30A and 16B and 30B. The active sections 22 are formed in the same manner as those used in CPVA 10 described above and are defined by the following equations (8) and (9):

$$x = \frac{b}{2}(1+k_1\varphi^2+k_2\varphi^4)\cos(\varphi) + \tag{8}$$
$$r\frac{\left\{\frac{b}{2}(2k_1\varphi+4k_2\varphi^3)\sin(\varphi)+\frac{b}{2}(1+k_1\varphi^2+k_2\varphi^4)\cos(\varphi)\right\}}{\sqrt{\left\{\left(\frac{b}{2}(2k_1\varphi+4k_2\varphi^3)\right)^2+\left(\frac{b}{2}\right)^2(1+k_1\varphi^2+k_2\varphi^4)^2(\varphi)\right\}}}$$

$$y = \frac{b}{2}(1+k_1\varphi^2+k_2\varphi^4)\sin(\varphi) + \tag{9}$$
$$r\frac{-\left\{\frac{b}{2}(2k_1\varphi+4k_2\varphi^3)\cos(\varphi)-\frac{b}{2}(1+k_1\varphi^2+k_2\varphi^4)\sin(\varphi)\right\}}{\sqrt{\left\{\left(\frac{b}{2}(2k_1\varphi+4k_2\varphi^3)\right)^2+\left(\frac{b}{2}\right)^2(1+k_1\varphi^2+k_2\varphi^4)^2(\varphi)\right\}}}$$

The active sections 22 of the apertures 30A and 30B are located on the plate 12 such that when the rollers 32 are in contact with the centers 28 of both apertures 16A and 30A and 16B and 30B, the distance from the center of mass "m" of the pendulum mass 14 to the rotational axis "A" or center of the plate 12 is equal to R+b.

The path "P" described above provides an improved vibration reduction over circular and cycloidal paths. In addition, the path "P" allows for quick and stable transient response during rapid engine speed changes.

The description of the invention is merely exemplary in nature and variations that do not depart from the gist of the invention are intended to be within the scope of the invention. Such variations are not to be regarded as a departure from the spirit and scope of the invention.

The invention claimed is:

1. An apparatus disposed between an engine that produces torque oscillations during engine revolution and a transmission, the apparatus comprising:
  a plate having a rotational axis and interconnected to the engine and interconnected to the transmission;
  at least one cylindrical member fixedly connected to the plate; and
  at least one mass member having a center of mass and having an aperture, wherein the cylindrical member is disposed through the aperture to support the mass member on the plate, wherein the aperture is defined by an inner surface having an active portion, wherein the active portion defines a movement path of the mass member around the rotational axis when the plate is rotating, and wherein the active portion has a contour defined on a Cartesian coordinate system that is a function of a tuning variable, first and second variables based on a torque oscillation order of the engine, an angular displacement of the mass member, and a radius of the cylindrical member,
  and wherein the active portion has a contour defined on a Cartesian coordinate system by the following equations:

$$x = b(1 + k_1\varphi^2 + k_2\varphi^4)\cos(\varphi) + r\frac{\{b(2k_1\varphi + 4k_2\varphi^3)\sin(\varphi) + b(1 + k_1\varphi^2 + k_2\varphi^4)\cos(\varphi)\}}{\sqrt{\{(b(2k_1\varphi + 4k_2\varphi^3))^2 + b^2(1 + k_1\varphi^2 + k_2\varphi^4)^2(\varphi)\}}}$$

$$y = b(1 + k_1\varphi^2 + k_2\varphi^4)\sin(\varphi) + r\frac{-\{b(2k_1\varphi + 4k_2\varphi^3)\cos(\varphi) - b(1 + k_1\varphi^2 + k_2\varphi^4)\sin(\varphi)\}}{\sqrt{\{(b(2k_1\varphi + 4k_2\varphi^3))^2 + b^2(1 + k_1\varphi^2 + k_2\varphi^4)^2(\varphi)\}}}$$

where x and y are coordinates on the Cartesian coordinate system that define the active portions at a given angular displacement, b is a tuning variable, K1 and K2 are first and second variables based on a torque oscillation order of the engine, respectively, and $\phi$ is the angular displacement of the center of mass about the axis of rotation during one full rotation of the plate, and
  wherein the tuning variable b is defined in the following equation:

$$\frac{R}{b} = \lambda n^2$$

where n is an integer that is defined as the number of engine torque oscillations per every engine revolution, R is a distance between the rotational axis and an origin of the Cartesian coordinate system, and $\lambda$ is a dynamic variable dependent on dynamic characteristics of the engine and the transmission,
  wherein the cylindrical member is disposed on the plate such that when the cylindrical member is located in the center of the active portion the distance from the center of mass of the mass member to the rotational axis is equal to the radius of the cylindrical member plus a distance from the rotational axis to an origin of the Cartesian coordinate system, and
  wherein as the plate rotates, the mass member absorbs a portion of the torque oscillations through the plate from the engine to the transmission as the mass member moves along the movement path.

2. The apparatus of claim 1 wherein the tuning variable is a function of the distance from the center of mass of the mass member to the rotational axis when the cylindrical member is located in the center of the active section, an integer that is defined as the number of engine torque oscillations per every engine revolution, and a dynamic variable dependent on dynamic characteristics of the engine and the transmission.

3. The apparatus of claim 2 wherein the dynamic variable is preferably between 1.0 and 1.3.

4. The apparatus of claim 1 wherein the first and second variables have a value of 0.025 and −0.1, respectively, when the torque oscillation order is 2, a value of 0.026 and −0.14, respectively, when the torque oscillation order is 3, and a value of 0.028 and −0.16, respectively, when the torque oscillation order is 4.

5. The apparatus of claim 1 wherein the angular displacement of the mass member is the angular displacement of the mass member about the rotational axis during one full revolution of the plate.

6. The apparatus of claim 1 further comprising two cylindrical members, and the mass member includes two apertures, each aperture having one of the two cylindrical members disposed therethrough, and wherein each cylindrical member is identical and each aperture is identical.

7. The apparatus of claim 6 further comprising four sets of two cylindrical members and four mass members each having two apertures, wherein each mass member is associated with one set of two cylindrical members, and wherein the four sets of cylindrical members are positioned symmetrically about the plate.

8. the apparatus of claim 1 wherein the plate is designed and configured to transmit torque between the engine and the transmission.

9. An apparatus disposed between an engine that produces torque oscillations during engine revolution and a transmission, the apparatus comprising:
  a plate designed and configured to transmit torque between the engine and the transmission, the plate having a rotational axis and interconnected to the engine and interconnected to the transmission;
  at least one cylindrical member; and
  at least one mass member having a center of mass and having an aperture, wherein the cylindrical member is disposed through the aperture to support the mass member on the plate, wherein the aperture is defined by an inner surface having an active portion, wherein the active portion defines a movement path of the mass member around the rotational axis when the plate is rotating, and wherein the active portion has a contour defined on a Cartesian coordinate system that is a function of a tuning variable, first and second variables based on a torque oscillation order of the engine, an angular displacement of the mass member, and a radius of the cylindrical member, wherein the cylindrical member is disposed on the plate such that when the cylindrical member is located in the center of the active portion the distance from the center of mass of the mass member to the rotational axis is equal to the radius of the cylindrical member plus a distance from the rotational axis to an origin of the Cartesian coordinate system, wherein as the plate rotates, the mass member absorbs a portion of the torque oscillations through the plate from the engine to the transmission as the mass member moves along the movement path and wherein the plate includes a plate aperture, wherein the plate aperture is defined by an inner surface having a passive portion and an active portion, wherein the active portions of the mass member aperture and the plate aperture define a movement path of the mass member around the rotational axis when the plate is rotating, and wherein the active portions of the plate aperture and mass member aperture have a contour defined on the Cartesian coordinate system that is a function of the tuning variable, the first and second variables based on the torque oscillation order of the engine, the angular displacement of the mass member, and the radius of the cylindrical member, and wherein the cylindrical member is disposed on the plate such that when the cylindrical member is located in the center of the active sections of the plate aperture and the mass member aperture, the distance from the center of mass of the mass member to the rotational axis is equal to the radius of the cylindrical member plus a distance from the rotational axis to an origin of the Cartesian coordinate system wherein the active portions of the mass member aperture and the plate aperture are each defined by the following equations:

$$x = \frac{b}{2}(1 + k_1\varphi^2 + k_2\varphi^4)\cos(\varphi) + r\frac{\left\{\frac{b}{2}(2k_1\varphi + 4k_2\varphi^3)\sin(\varphi) + \frac{b}{2}(1 + k_1\varphi^2 + k_2\varphi^4)\cos(\varphi)\right\}}{\sqrt{\left\{\left(\frac{b}{2}(2k_1\varphi + 4k_2\varphi^3)\right)^2 + \left(\frac{b}{2}\right)^2(1 + k_1\varphi^2 + k_2\varphi^4)^2(\varphi)\right\}}}$$

$$y = \frac{b}{2}(1 + k_1\varphi^2 + k_2\varphi^4)\sin(\varphi) + r\frac{-\left\{\frac{b}{2}(2k_1\varphi + 4k_2\varphi^3)\cos(\varphi) - \frac{b}{2}(1 + k_1\varphi^2 + k_2\varphi^4)\sin(\varphi)\right\}}{\sqrt{\left\{\left(\frac{b}{2}(2k_1\varphi + 4k_2\varphi^3)\right)^2 + \left(\frac{b}{2}\right)^2(1 + k_1\varphi^2 + k_2\varphi^4)^2(\varphi)\right\}}}$$

where x and y are coordinates on the Cartesian coordinate system that define the active portions at a given angular displacement, b is the tuning variable, K1 and K2 are the first and second variables based on a torque oscillation order of the engine, respectively, and φ is the angular displacement of the center of mass about the axis of rotation.

10. The apparatus of claim 9 wherein the tuning variable is a function of the distance from the center of mass of the mass member to the rotational axis when the cylindrical member is located in the center of the active sections of the plate and the mass member, an integer that is defined as the number of engine torque oscillations per every engine revolution, and a dynamic variable dependent on dynamic characteristics of the engine and the transmission, wherein the dynamic variable is preferably between 1.0 and 1.3, and wherein the first and second variables have a value of 0.025 and −0.1, respectively, when the torque oscillation order is 2, a value of 0.026 and −0.14, respectively, when the torque oscillation order is 3, and a value of 0.028 and −0.16, respectively, when the torque oscillation order is 4.

11. An apparatus used between an engine that produces torque oscillations during engine revolution and a transmission, the apparatus comprising:

a plate having a rotational axis and interconnected to the engine and interconnected to the transmission;

at least one cylindrical member fixedly connected to the plate; and at least one mass member having a center of mass and having an aperture, wherein the cylindrical member is disposed through the aperture to support the mass member on the plate, wherein the aperture is defined by an inner surface having a passive portion and an active portion, wherein the active portion defines a movement path of the mass member around the rotational axis when the plate is rotating, and wherein the active portion has a contour defined on a Cartesian coordinate system by the following equations:

$$x = b(1 + k_1\varphi^2 + k_2\varphi^4)\cos(\varphi) + r\frac{\{b(2k_1\varphi + 4k_2\varphi^3)\sin(\varphi) + b(1 + k_1\varphi^2 + k_2\varphi^4)\cos(\varphi)\}}{\sqrt{\{(b(2k_1\varphi + 4k_2\varphi^3))^2 + b^2(1 + k_1\varphi^2 + k_2\varphi^4)^2(\varphi)\}}}$$

$$y = b(1 + k_1\varphi^2 + k_2\varphi^4)\sin(\varphi) + r\frac{-\{b(2k_1\varphi + 4k_2\varphi^3)\cos(\varphi) - b(1 + k_1\varphi^2 + k_2\varphi^4)\sin(\varphi)\}}{\sqrt{\{(b(2k_1\varphi + 4k_2\varphi^3))^2 + b^2(1 + k_1\varphi^2 + k_2\varphi^4)^2(\varphi)\}}}$$

where x and y are coordinates on the Cartesian coordinate system that define the active portions at a given angular displacement, b is a tuning variable, K1 and K2 are first and second variables based on a torque oscillation order of the engine, respectively, and φ is the angular displacement of the center of mass about the axis of rotation during one full rotation of the plate, and wherein the tuning variable b is defined in the following equation:

$$\frac{R}{b} = \lambda n^2$$

where n is an integer that is defined as the number of engine torque oscillations per every engine revolution, R is a distance between the rotational axis and an origin of the Cartesian coordinate system, and λ is a dynamic variable dependent on dynamic characteristics of the engine and the transmission, wherein the cylindrical member is disposed on the plate such that when the cylindrical member is located in the center of the active section the distance from the center of mass of the mass member to the rotational axis is equal to the radius of the cylindrical member plus the distance from the rotational axis to the origin of the Cartesian coordinate system, and wherein as the plate rotates, the mass member absorbs a portion of the torque oscillations through the plate from the engine to the transmission as the mass member moves along the mass member path.

12. The apparatus of claim 11 wherein the dynamic variable is preferably between 1.0 and 1.3.

13. The apparatus of claim 12 wherein the first and second variables have a value of 0.025 and −0.1, respectively, when the torque oscillation order is 2, a value of 0.026 and −0.14, respectively, when the torque oscillation order is 3, and a value of 0.028 and −0.16, respectively, when the torque oscillation order is 4.

14. the apparatus of claim 11 wherein the plate is designed and configured to transmit torque between the engine and the transmission.

15. An apparatus used between an engine that produces torque oscillations during engine revolution and a transmission, the apparatus comprising:
- a plate having a rotational axis and interconnected to the engine and interconnected to the transmission;
- at least one cylindrical member fixedly connected to the plate; and
- at least one mass member having a center of mass and having an aperture, wherein the cylindrical member is disposed through the aperture to support the mass member on the plate, wherein the center of mass of the mass member has a path around the rotational axis when the plate is rotating, wherein the path is defined on a rotating Cartesian coordinate system having an origin a distance R from the rotational axis and having an axis that passes through the rotational axis as the Cartesian coordinate system rotates, wherein the path is defined on the rotating Cartesian coordinate system that is a function of a tuning variable, first and second variables based on a torque oscillation order of the engine, and an angular displacement of the mass member, and
- wherein as the plate rotates, the mass member absorbs a portion of the torque oscillations through the plate from the engine to the transmission as the mass member moves along the mass member path
- wherein the path of the center of mass of the mass member about the rotational axis is defined by the following equations:

$$x=b(1+k_1\phi^2+k_2\phi^4)\cos(\phi)$$

$$y=b(1+k_1\phi^2+k_2\phi^4)\sin(\phi)$$

where x and y are coordinates on the rotating Cartesian coordinate system that define the location of the center of mass at a given angular displacement, b is the tuning variable, K1 and K2 are the first and second variables based on a torque oscillation order of the engine, respectively, and $\phi$ is the angular displacement of the center of mass about the origin of the rotating Cartesian coordinate system and
- wherein the tuning variable is a function of the distance from the center of mass of the mass member to the rotational axis when the cylindrical member is located in the center of the active section, an integer that is defined as the number of engine torque oscillations per every engine revolution, and a dynamic variable dependent on dynamic characteristics of the engine and the transmission and
- wherein the dynamic variable is preferably between 1.0 and 1.3 and
- wherein the first and second variables have a value of 0.025 and −0.1, respectively, when the torque oscillation order is 2, a value of 0.026 and −0.14, respectively, when the torque oscillation order is 3, and a value of 0.028 and −0.16, respectively, when the torque oscillation order is 4.

\* \* \* \* \*